United States Patent
Mei et al.

(10) Patent No.: US 11,453,767 B2
(45) Date of Patent: Sep. 27, 2022

(54) PROPYLENE ETHYLENE RANDOM COPOLYMER

(71) Applicant: BASELL POLIOLEFINE ITALIA S.R.L., Milan (IT)

(72) Inventors: Gabriele Mei, Channelview, TX (US); Antonio Mazzucco, Ferrara (IT); Tiziana Caputo, Ferrara (IT); Enrico Balestra, Ferrara (IT); Davide Tartari, Ferrara (IT); Gilberto Moscardi, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 394 days.

(21) Appl. No.: 16/495,289

(22) PCT Filed: Mar. 23, 2018

(86) PCT No.: PCT/EP2018/057505
§ 371 (c)(1),
(2) Date: Sep. 18, 2019

(87) PCT Pub. No.: WO2018/177952
PCT Pub. Date: Oct. 4, 2018

(65) Prior Publication Data
US 2020/0032041 A1 Jan. 30, 2020

(30) Foreign Application Priority Data
Mar. 27, 2017 (EP) ..................... 17162952

(51) Int. Cl.
*C08F 210/06* (2006.01)
*C08L 23/10* (2006.01)
*C08L 23/12* (2006.01)
*C08L 23/06* (2006.01)

(52) U.S. Cl.
CPC ............... *C08L 23/12* (2013.01); *C08L 23/06* (2013.01); *C08F 210/06* (2013.01); *C08L 2207/06* (2013.01)

(58) Field of Classification Search
CPC .................. C08F 10/06; C08F 210/06
See application file for complete search history.

(56) References Cited

U.S. PATENT DOCUMENTS

| 4,399,054 A | 8/1983 | Ferraris et al. |
| 4,469,648 A | 9/1984 | Ferraris et al. |

FOREIGN PATENT DOCUMENTS

| CN | 101516929 A | 8/2009 |
| CN | 102985479 A | 3/2013 |
| CN | 106062014 A | 10/2016 |
| EP | 45977 A2 | 2/1982 |
| EP | 361494 A2 | 4/1990 |
| EP | 395083 A2 | 10/1990 |
| EP | 728769 A1 | 8/1996 |
| EP | 1272533 A1 | 1/2003 |
| EP | 3015503 A1 | 5/2016 |
| WO | 9844001 A1 | 10/1998 |
| WO | 0063261 A1 | 10/2000 |
| WO | 0192406 A1 | 12/2001 |
| WO | 2008012144 A1 | 1/2008 |
| WO | 2009080660 A1 | 7/2009 |
| WO | 2011144489 A1 | 11/2011 |
| WO | 2013092615 A1 | 6/2013 |

OTHER PUBLICATIONS

D. Geldart, Gas Fluidisation Technology, p. 155 et seq., J. Wiley & Sons Ltd., 1986.
Monomer Sequence Distribution in Ethylene-Propylene Rubber Measured by 13C NMR. 3. Use of Reaction Probability Mode C. J. Carman, R. A. Harrington and C. E. Wilkes, Macromolecules, 1977, 10, 536.
Huggins, M.L., J. Am. Chem. Soc., 1942, 64, 2716.
International Search Report and Written Opinion dated Jun. 11, 2018 (Jun. 11, 2018) for Corresponding PCT/EP2018/057505).

*Primary Examiner* — Irina S Zemel
*Assistant Examiner* — Jeffrey S Lenihan

(57) ABSTRACT

A propylene ethylene copolymer having:
(i) an ethylene derived units content (C2) ranging from 2.0 wt % to 11.0 wt %, based upon the total weight of the copolymer;
(ii) a fraction soluble in xylene (Xs) at 25° C. (Xs) ranging from 7.1 wt % to 28.5 wt %, based upon the total weight of the copolymer;
(iii) an intrinsic viscosity of the fraction soluble in xylene at 25° C. ranging from 3.2 dl/g to 5.6 dl/g;
(iv) a melting point (Tm) higher than 140.0° C. and fulfilling the relation (I):

$Tm > 155 - 1.4 \times C2$ (I); and (v) a flexural modulus (TM) higher than 500 MPa and fulfilling the relation (II)

$TM > 1900 - 285 \times C2 + 50 \times Xs$ (II).

10 Claims, No Drawings

PROPYLENE ETHYLENE RANDOM COPOLYMER

This application is the U.S. National Phase of PCT International Application PCT/EP2018/057505, filed Mar. 23, 2018, claiming benefit of priority to European Patent Application No. 17162952.0, filed Mar. 27, 2017, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to propylene ethylene random copolymer obtained with a gas phase process.

BACKGROUND OF THE INVENTION

Isotactic polypropylene has several uses.

In some instances, the properties of the isotactic polypropylene are improved by decreasing the crystallinity of the propylene homopolymer through copolymerization of the propylene with small quantities of ethylene or α-olefins such as 1-butene, 1-pentene and 1-hexene. The resulting random crystalline propylene copolymers which, when compared to the homopolymer, have better flexibility and transparency.

In some instances, propylene random copolymers lack sufficient flexural modulus to be used in some applications such as rigid packaging.

SUMMARY OF THE INVENTION

In a general embodiment, the present disclosure provides a random propylene ethylene copolymer having improved flexural modulus.

In a general embodiment, the present disclosure provides a propylene ethylene copolymer having:
(i) an ethylene derived units content (C2) ranging from 2.0 wt % to 11.0 wt %, based upon the total weight of the copolymer;
(ii) a fraction soluble in xylene (Xs) at 25° C. ranging from 7.1 wt % to 28.5 wt %, based upon the total weight of the copolymer;
(iii) an intrinsic viscosity of the fraction soluble in xylene at 25° C., ranging from 3.2 dl/g to 5.6 dl/g;
(iv) a melting point (Tm) higher than 140.0° C. and fulfilling the relation (I):

$$Tm > 155 - 1.4 \times C2 \quad (I),$$

wherein Tm is the melting point of the propylene ethylene copolymer measured by DSC and C2 is the wt % of ethylene derived units of the propylene ethylene copolymer, based upon the total weight of the copolymer; and
(v) a flexural modulus, TM, higher than 500 MPa and fulfilling the relation (II):

$$TM > 1900 - 285 \times C2 + 50 \times Xs \quad (II),$$

wherein TM is the flexural modulus in MPa, C2 is the wt % of ethylene derived units of the propylene ethylene copolymer, based upon the total weight of the copolymer, and Xs is the fraction soluble in xylene at 25° C. (wt %) of the propylene ethylene copolymer, based upon the total weight of the copolymer.

DETAILED DESCRIPTION OF THE INVENTION

In a general embodiment, the present disclosure provides a random propylene ethylene copolymer having improved flexural modulus.

In a general embodiment, the present disclosure provides a propylene ethylene copolymer having:
(i) an ethylene derived units content (C2) ranging from 2.0 wt % to 11.0 wt %, alternatively from 3.3 wt % to 10.2 wt %; alternatively from 3.8 wt % to 9.2 wt %; alternatively from 4.0 wt % to 6.5 wt %, based upon the total weight of the copolymer;
(ii) a fraction soluble in xylene (Xs) at 25° C. ranging from 7.1 wt % to 28.5 wt %; alternatively from 8.2 wt % to 25.3 wt %; alternatively from 9.1 wt % to 22.0 wt %; alternatively from 9.3 wt % to 14.1 wt %, based upon the total weight of the copolymer;
(iii) an intrinsic viscosity of the fraction soluble in xylene at 25° C. ranging from 3.2 dl/g to 5.6 dl/g; alternatively from 3.5 dl/g to 5.2 dl/g; alternatively from 3.7 dl/g to 5.0 dl/g;
(iv) a melting point (Tm) higher than 140.0° C. and fulfilling the relation (I):

$$Tm > 155 - 1.4 \times C2 \quad (I);$$

alternatively relation (I) is $Tm > 156 - 1.4 \times C2$; alternatively relation (I) is $Tm > 157 - 1.4 \times C2$,
wherein Tm is the melting point of the propylene ethylene copolymer measured by DSC and C2 is the wt % of ethylene derived units of the propylene ethylene copolymer, based upon the total weight of the copolymer; and
(v) a flexural modulus, TM, higher than 500 MPa and fulfilling the relation (II)

$$TM > 1900 - 285 \times C2 + 50 \times Xs \quad (II);$$

alternatively relation (II) is $TM > 1920 - 285 \times C2 + 50 \times Xs$; alternatively relation (II) is $TM > 1950 - 285 \times C2 + 50 \times Xs$,
wherein TM is the flexural modulus in MPA, C2 is the wt % of ethylene derived units of the propylene ethylene copolymer, based upon the total weight of the copolymer, and Xs is the fraction soluble in xylene at 25° C. (wt %) of the propylene ethylene copolymer, based upon the total weight of the copolymer.

In some embodiments, the melt flow rate MFR. (ISO 1133 (230° C., 2.16 kg) of the propylene ethylene copolymer of the present disclosure ranges from 0.2 g/10 min to 100.0 g/10 min; alternatively from 0.2 to 50.0 g/10 min; alternatively from 0.2 to 10 g/10 min.

As used herein, the term "propylene ethylene copolymer" refers to a bipolymer containing only propylene and ethylene.

In some embodiments, the propylene ethylene copolymer is useful for rigid packaging applications.

In some embodiments, the propylene ethylene copolymer of the present disclosure is obtained with a process carried out in a reactor having two interconnected polymerization zones, a riser and a downcomer, wherein the growing polymer particles:
(a) flow through the first polymerization zone, the riser, under fast fluidization conditions in the presence of propylene and of ethylene;
(b) leave the riser and enter the second polymerization zone, the downcomer, through which the growing polymer particles flow downward in a densified form in the presence of propylene and of ethylene wherein the concentration of ethylene in the downcomer is higher than in the riser;

(c) leave the downcomer and are reintroduced into the riser, thereby establishing a circulation of polymer between the riser and the downcomer.

In some embodiments, the present disclosure provides a propylene ethylene copolymer having the above described features and being obtained with a process carried out in a reactor having two interconnected polymerization zones, a riser and a downcomer, wherein the growing polymer particles:

(d) flow through the first polymerization zone, the riser, under fast fluidization conditions in the presence of propylene and of ethylene;

(e) leave the riser and enter the second polymerization zone, the downcomer, through which the growing polymer particles flow downward in a densified form in the presence of propylene and of ethylene wherein the concentration of ethylene in the downcomer is higher than in the riser;

leave the downcomer and are reintroduced into the riser, thereby establishing a circulation of polymer between the riser and the downcomer.

In some embodiments and in the first polymerization zone (riser), fast fluidization conditions are established by feeding a gas mixture made from or containing one or more alpha-olefins at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In some embodiments and in the second polymerization zone (downcomer), the polymer particles flow under the action of gravity in a densified form, thereby achieving the high values of density of the solid (mass of polymer per volume of reactor) and approaching the bulk density of the polymer. As used herein, the term "densified form" of the polymer indicates that the ratio between the mass of polymer particles and the reactor volume is higher than 80% of the "poured bulk density" of the polymer. In some embodiments and in the downcomer, the polymer flows downward in a plug flow and small quantities of gas are entrained with the polymer particles.

In some embodiments, the two interconnected polymerization zones are operated such that the gas mixture coming from the riser is totally or partially prevented from entering the downcomer by introducing into the upper part of the downcomer a liquid or gas stream, denominated "barrier stream", having a composition different from the gaseous mixture present in the riser. In some embodiments, one or more feeding lines for the barrier stream are placed in the downcomer close to the upper limit of the volume occupied by the polymer particles flowing downward in a densified form.

In some embodiments, this liquid/gas mixture fed into the upper part of the downcomer partially replaces the gas mixture entrained with the polymer particles entering the downcomer. The partial evaporation of the liquid in the barrier stream generates in the upper part of the downcomer a flow of gas, which moves counter-currently to the flow of descending polymer, thereby acting as a barrier to the gas mixture coming from the riser and entrained among the polymer particles. In some embodiments, the liquid/gas barrier fed to the upper part of the downcomer is sprinkled over the surface of the polymer particles. In some embodiments, the evaporation of the liquid provides the upward flow of gas.

In some embodiments, the feed of the barrier stream causes a difference in the concentrations of monomers or hydrogen (molecular weight regulator) inside the riser and the downcomer, thereby producing a bimodal polymer.

In some embodiments, the gas-phase polymerization process involves a reaction mixture made from or containing the gaseous monomers, inert polymerization diluents and chain transfer agents to regulate the molecular weight of the polymeric chains. In some embodiments, hydrogen is used to regulate the molecular weight. In some embodiments, the polymerization diluents are selected from C2-C8 alkanes, alternatively propane, isobutane, isopentane and hexane. In some embodiments, propane is used as the polymerization diluent in the gas-phase polymerization.

In some embodiments, the barrier stream is made from or contains:

i. from 10 to 100% by mol of propylene, based upon the total moles in the barrier stream;

ii. from 0 to 80% by mol of ethylene, based upon the total moles in the barrier stream;

iii. from 0 to 30% by mol of propane, based upon the total moles in the barrier stream; and iv. from 0 to 5% by mol of hydrogen, based upon the total moles in the barrier stream.

In some embodiments, the composition of the barrier stream is obtained from the condensation of a part of the fresh monomers and propane, wherein the condensed part is fed to the upper part of the downcomer in a liquid form. In some embodiments, the composition of the barrier stream is derived from condensation or distillation of part of a gaseous stream continuously recycled to the reactor having two interconnected polymerization zones.

In some embodiments, additional liquid or gas is fed along the downcomer at a point below the barrier stream.

In some embodiments, the recycle gas stream is withdrawn from a gas/solid separator placed downstream the riser, cooled by passage through an external heat exchanger and then recycled to the bottom of the riser. In some embodiments, the recycle gas stream is made from or contains the gaseous monomers, the inert polymerization components, and chain transfer agents. In some embodiments, the inert polymerization components include propane. In some embodiments, the chain transfer agents include hydrogen. In some embodiments, the composition of the barrier stream deriving from condensation or distillation of the gas recycle stream is adjusted by feeding liquid make-up monomers and propane before the gas recycle stream's introduction into the upper part of downcomer.

In some embodiments and in both riser and downcomer, the temperature is between 60° C. and 120° C. while the pressure ranges from 5 to 40 bar.

In some embodiments, the process for preparing the propylene ethylene copolymer of the present disclosure is carried out in presence of a stereospecific heterogeneous Ziegler-Natta catalyst. In some embodiments, the Ziegler-Natta catalysts is made from or contains a solid catalyst component made from or containing at least one titanium compound having at least one titanium-halogen bond and at least an electron-donor compound (internal donor), both supported on magnesium chloride. In some embodiments, the Ziegler-Natta catalysts systems is further made from or contains an organo-aluminum compound as a co-catalyst and optionally an external electron-donor compound.

In some embodiments, the catalysts systems are as described in the European Patent Nos. EP45977, EP361494, EP728769, and EP 1272533 and Patent Cooperation Treaty Publication No. WO063261.

In some embodiments, the solid catalyst component is made from or contains Mg, Ti, halogen and an electron donor selected from succinates of formula (I):

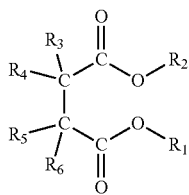

(I)

wherein the radicals $R^1$ and $R^2$, equal to or different from each other, are a $C_1$-$C_{20}$ linear or branched alkyl, alkenyl, cycloalkyl, aryl, arylalkyl or alkylaryl group, optionally containing heteroatoms belonging to groups 15-17 of the periodic table; the radicals $R^3$ to $R^6$ equal to or different from each other, are hydrogen or a $C_1$-$C_2$ linear or branched alkyl, alkenyl, cycloalkyl, aryl, arylalkyl or alkylaryl group, optionally containing heteroatoms, and the radicals $R^3$ to $R^6$ which are joined to the same carbon atom can be linked together to form a cycle.

In some embodiments, $R^1$ and $R^2$ are $C_1$-$C_8$ alkyl, cycloalkyl, aryl, arylalkyl and alkylaryl groups.

In some embodiments, the compounds have $R^1$ and $R^2$ selected from primary alkyls and alternatively branched primary alkyls. In some embodiments, $R^1$ and $R^2$ groups are selected from the group consisting of methyl, ethyl, n-propyl, n-butyl, isobutyl, neopentyl, and 2-ethylhexyl. In some embodiments, $R^1$ and $R^2$ groups are selected from the group consisting of ethyl, isobutyl, and neopentyl.

In some embodiments, $R^3$ to $R^5$ are hydrogen and $R^6$ is a branched alkyl, cycloalkyl, aryl, arylalkyl and alkylaryl radical having from 3 to 10 carbon atoms. In some embodiments, at least two radicals from $R^3$ to $R^6$ are different from hydrogen and are selected from $C_1$-$C_{20}$ linear or branched alkyl, alkenyl, cycloalkyl, aryl, arylalkyl or alkylaryl group, optionally containing heteroatoms belonging to groups.

In some embodiments, the two radicals different from hydrogen are linked to the same carbon atom. In some embodiments, the at least two radicals different from hydrogen are linked to different carbon atoms. In some embodiments, the radicals are $R^3$ and $R^5$ or $R^4$ and $R^6$.

In some embodiments, the solid catalyst component is prepared by reacting a titanium compound of formula $Ti(OR)_{n-y}X_y$ where n is the valence of titanium and y is a number between 1 and n, alternatively $TiCl_4$, with a magnesium chloride deriving from an adduct of formula $MgCl_2 \cdot pROH$, where p is a number between 0.1 to 6, alternatively from 2 to 3.5, and R is a hydrocarbon radical having 1-18 carbon atoms. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the spherical adducts are prepared as described in U.S. Pat. Nos. 4,399,054 and 4,469,648. In some embodiments, the adduct is directly reacted with the Ti compound. In some embodiments, the adduct is subjected to thermal controlled dealcoholation (80-130° C.) to obtain an adduct in which the number of moles of alcohol is lower than 3, alternatively between 0.1 and 2.5. In some embodiments, the reaction with the Ti compound is carried out by suspending the adduct in cold $TiCl_4$; the mixture is heated up to 80-130° C. and kept at this temperature for 0.5-2 hours. In some embodiments, the adduct is dealcoholated. In some embodiments, the cold $TiCl_4$ is at 0° C. In some embodiments, the treatment with $TiCl_4$ is carried out one or more times. In some embodiments, the internal donor is added during the treatment with $TiCl_4$ and the treatment with the electron donor compound is repeated one or more times. In some embodiments, the succinate of formula (I) is used in molar ratio with respect to the $MgCl_2$ of from 0.01 to 1, alternatively from 0.05 to 0.5. In some embodiments, the catalyst components in spherical form are prepared as described in European Patent Application No. EP-A-395083 and Patent Cooperation Treaty Publication No. WO9844001. In some embodiments, the solid catalyst components show a surface area (by B.E.T. method) between 20 and 500 m²/g and alternatively between 50 and 400 m²/g, and a total porosity (by B.E.T. method) higher than 0.2 cm³/g, alternatively between 0.2 and 0.6 cm³/g. In some embodiments, the porosity (Hg method) due to pores with radius up to 10.000 A ranges from 0.3 to 1.5 cm³/g, alternatively from 0.45 to 1 cm³/g.

In some embodiments, the organo-aluminum compound is an alkyl-Al selected from trialkyl aluminum compounds. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the organo-aluminum compounds are mixtures of trialkylaluminums with alkylaluminum halides, alkylaluminum hydrides or alkylaluminum sesquichlorides. In some embodiments, the alkylaluminum sesquichlorides are selected from the group consisting of $AlEt_2Cl$ and $Al_2Et_3Cl_3$.

In some embodiments, the external electron-donor compounds include silicon compounds, ethers, esters, amines, heterocyclic compounds, ketones and 1,3-diethers. In some embodiments, the external electron-donor compound is ethyl 4-ethoxybenzoate. In some embodiments, the external electron-donor compound is 2,2,6,6-tetramethyl piperidine. In some embodiments, the external donor compounds are silicon compounds of formula $R_a^5 R_b^6 Si(OR^7)_c$ where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. In some embodiments, the silicon compounds are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metildimethoxysilane. In some embodiments, the external electron donor compound is used in such an amount to give a molar ratio between the organo-aluminum compound and the electron donor compound of from 0.1 to 500; alternatively from 1 to 100; alternatively from 2 to 50.

EXAMPLES

The following examples are given without any limiting purpose.
Test Methods
  Melt Flow Rate (MFR "L")
  Determined according to ISO 1133 (230° C., 2.16 Kg)
  $^{13}C$ NMR of Propylene/Ethylene Copolymers
  $^{13}C$ NMR spectra were acquired on a Bruker AV-600 spectrometer equipped with cryoprobe, operating at 160.91 MHz in the Fourier transform mode at 120° C.
The peak of the Sββ carbon was used as internal reference at 29.9 ppm. (The nomenclature was according to "Monomer Sequence Distribution in Ethylene-Propylene Rubber Measured by 13C NMR. 3. Use of Reaction Probability Mode" C. J. Carman, R. A. Harrington and C. E. Wilkes, Macromolecules, 1977, 10, 536.) The samples were dissolved in 1,1,2,2-tetrachloroethane-d2 at 120° C. with an 8% wt/v concentration. Each spectrum was acquired with a 90° pulse, 15 seconds of delay between pulses and CPD, to remove 1H-13C coupling. 512 transients were stored in 32K data points using a spectral window of 9000 Hz.

The assignments of the spectra, the evaluation of triad distribution and the composition were made according to Kakugo ("Carbon-13 NMR determination of monomer sequence distribution in ethylene-propylene copolymers prepared with δ-titanium trichloride-diethylaluminum chloride" M. Kakugo, Y. Naito, K. Mizunuma and T. Miyatake, Macromolecules, 1982, 15, 1150) using the following equations:

$$PPP=100T\beta\beta/S \quad PPE=100T\beta\delta/S \quad EPE=100T\delta\delta/S$$

$$PEP=100S\beta\beta/S \quad PEE=100S\beta\delta/S \quad EEE=100(0.25S\gamma\delta+0.5S\delta\delta)/S$$

$$S=T\beta\beta+T\beta\delta+T\delta\delta+S\beta\beta+S\beta\delta+0.25S\gamma\delta+0.5S\delta\delta$$

The molar percentage of ethylene content was evaluated using the following equation:

$$E\% \text{ mol}=100*[PEP+PEE+EEE].$$

The weight percentage of ethylene content was evaluated using the following equation:

$$E\% \text{ wt.} = \frac{100*E\% \text{ mol}*MWE}{E\% \text{ mol}*MWE + P\% \text{ mol}*MWP}$$

wherein P % mol is the molar percentage of propylene content while MWE and MWP are the molecular weights of ethylene and propylene, respectively.

The product of reactivity ratio r1r2 was calculated according to Carman (C. J. Carman, R. A. Harrington and C. E. Wilkes, Macromolecules, 1977; 10, 536) as:

$$r_1 r_2 = 1 + \left(\frac{EEE+PEE}{PEP}+1\right)-\left(\frac{P}{E}+1\right)\left(\frac{EEE+PEE}{PEP}+1\right)^{0.5}$$

The tacticity of Propylene sequences was calculated as mm content from the ratio of the PPP mmT$_{\beta\beta}$ (28.90-29.65 ppm) and the whole mmT$_{\beta\beta}$ (29.80-28.37 ppm)

Xylene-Soluble Fraction (XS)

The Xylene-Soluble fraction (XS) was measured according to ISO 16152:2005, but with the following deviations:
- the volume of the polymer solution was 250 mL instead of 200 mL;
- the precipitation stage was carried out at 25° C. for 30 minutes, but for the final 10 minutes the polymer solution was kept under stirring by a magnetic stirrer instead of no stirring at all;
- the final drying step was done under vacuum at 70° C. instead of 100° C.

The XS is expressed as a weight percentage of the original 2.5 grams of polymer.

Intrinsic Viscosity of Xylene Soluble Fraction (XSIV)
Intrinsic Viscosity [η]

The sample was dissolved in tetrahydronaphthalene at 135° C. and then poured into a capillary viscometer. The viscometer tube (Ubbelohde type) was surrounded by a cylindrical glass jacket; this setup allowed temperature control with a circulating thermostatic liquid. The downward passage of the meniscus was timed by a photoelectric device.

The passage of the meniscus in front of the upper lamp started the counter which had a quartz crystal oscillator. The meniscus stopped the counter as the meniscus passed the lower lamp and the efflux time was registered: the efflux time was converted into a value of intrinsic viscosity through Huggins' equation (Huggins, M. L., J. Am. Chem. Soc., 1942, 64, 2716), using the flow time of the pure solvent at the same experimental conditions (same viscometer and same temperature). A single polymer solution was used to determine [η].

Flexural Modulus (MEF)

Determined according to ISO 178.

Samples for the mechanical analysis were obtained according to ISO 3167.

Melting Temperature (Tm) and Crystallization Temperature (Tc)

Melting temperature and crystallization temperature were determined by differential scanning calorimetry (DSC) according to the ASTM D 3417 method, which is equivalent to the ISO 11357/1 and 3 method.

Example 1

Preparation of the Ziegler-Natta Solid Catalyst Component

The Ziegler-Natta catalyst was prepared according to Example 5, lines 48-55, of the European Patent No. EP728769B1.

Preparation of the Catalyst System—Precontact

Before introducing the solid catalyst component into the polymerization reactors, the solid catalyst component was contacted with aluminum-triethyl (TEAL) and with the dicyclopentyldimethoxysilane (D donor) under the conditions reported in Table 1.

Prepolymerization

The catalyst system was subjected to prepolymerization treatment at 20° C. by maintaining the catalyst system in suspension in liquid propylene for a residence time of 9 minutes before introducing the catalyst system into the polymerization reactor.

Polymerization

The polymerization was carried out in gas-phase polymerization reactor including two interconnected polymerization zones, a riser and a downcomer, as described in European Patent No. EP782587. Hydrogen was used as molecular weight regulator. The polymer particles exiting from the polymerization step were subjected to a steam treatment to remove the unreacted monomers and dried under a nitrogen flow.

The main precontact, prepolymerization and polymerization conditions and the quantities of monomers and hydrogen fed to the polymerization reactor are reported in Table 1. Characterization data for the polymers are reported in Table 2.

Comparative Example 4

Comparative Example 4 was prepared like Example 1, except that the polymerization was carried out according to the procedure described in Patent Cooperation Treaty Publication No. WO2011/144489, wherein the random propylene copolymer (RACO) was produced in the downcomer and the bipolymer (BIPO) was produced in the riser.

The main precontact, prepolymerization and polymerization conditions and the quantities of monomers and hydrogen fed to the polymerization reactor are reported in Table 1. Characterization data for the polymers are reported in Table 2.

TABLE 1

| Process conditions | | Example | | |
|---|---|---|---|---|
| | | 1 | 2 | 3 |
| PRECONTACT | | | | |
| Temperature | °C. | 15 | 15 | 15 |
| Residence Time | min | 15 | 15 | 15 |
| TEAL/catalyst | wt/wt | 6 | 6 | 5 |
| TEAL/Ext. Donor | g/g | 4 | 4 | 4 |
| PREPOLYMERIZATION | | | | |
| Temperature | °C. | 20 | 20 | 20 |
| Residence Time | min | 8 | 8 | 8 |
| POLYMERIZATION | | | | |
| Temperature | bar-g | 68 | 64 | 63 |
| Pressure | bar-g | 25 | 24 | 23 |
| Residence Time | min | 106 | 109 | 103 |
| Mileage | kg/kg | 27 | 33 | 32 |
| Split holdup riser | wt % | 30 | 30 | 33 |
| Split holdup downcomer | wt % | 70 | 70 | 66 |
| $C_2^-/C_2^- + C_3^-$ riser | mol/mol | 0.005 | 0.008 | 0.014 |
| $C_2^-/C_2^- + C_3^-$ downcomer | mol/mol | 0.017 | 0.025 | 0.05 |
| $H_2/C_3^-$ riser | mol/mol | 0.013 | 0.013 | 0.063 |
| $H_2/C_2^-$ downcomer | mol/mol | $2.4*10^-4$ | $1.2*10^-4$ | $1.2*10^-4$ |

Notes:
$C_2^-$ = ethylene;
$C_3^-$ = propylene;
$H_2$ = hydrogen;
Split = amount of polymer prepared in each reactor based on the total weight.

TABLE 2

| Polymer characterization | | | | | | | |
|---|---|---|---|---|---|---|---|
| Example | | 1 | 2 | 3 | comp ex 4 | comp ex 5 | comp ex 6 |
| MFR (230° C./2.16 kg) | g/10' | 0.45 | 0.22 | 0.48 | 0.48 | 1.8 | 0.8 |
| Ethylene units | % wt | 4.2 | 6.2 | 8.5 | 9.6 | 4.3 | 6.5 |
| XS | % | 9.6 | 13.7 | 21.4 | 30 | 7.7 | 19.8 |
| XSIV | dl/g | 3.9 | 4.3 | 4.7 | 2.69 | 0.74 | 1.46 |
| Flex. Mod. | MPa | 1335 | 970 | 700 | 395 | 690 | 505 |
| Tm | °C. | 152.1 | 149.8 | 145.7 | 142.2 | 136.9 | 129.1 |
| Tc | °C. | 101.0 | 98.3 | 93.7 | 95.3 | 88.3 | 85.7 |
| 1900 − 285xC2 + 50xXs | | 1183 | 818 | 478 | 664 | 1060 | 1038 |

Comparative example 5 is a commercial product Moplen RP220M sold by Lyondellbasell
Comparative example 6 is a commercial product Clyrell RC1908 sold by Lyondellbasell

What is claimed is:

1. A propylene ethylene copolymer having:
   (i) an ethylene derived units content (C2) ranging from 2.0 wt % to 11.0 wt %, based upon the total weight of the copolymer;
   (ii) a fraction soluble in xylene at 25° C. (Xs) ranging from 7.1 wt % to 28.5 wt %, based upon the total weight of the copolymer;
   (iii) an intrinsic viscosity of the fraction soluble in xylene at 25° C. ranging from 3.2 dl/g to 5.6 dl/g;
   (iv) a melting point (Tm) higher than 140.0° C. and fulfilling the relation (I):

$$Tm > 155 - 1.4 \times C2 \qquad (I),$$

wherein Tm is the melting point of the propylene ethylene copolymer measured by DSC and C2 is the wt % of ethylene derived units of the propylene ethylene copolymer, based upon the total weight of the copolymer; and (v) a flexural modulus (TM) higher than 500 MPa and fulfilling the relation (II)

$$TM > 1900 - 285 \times C2 + 50 \times Xs \qquad (II),$$

wherein TM is the flexural modulus in MPA, C2 is the wt % of ethylene derived units of the propylene ethylene copolymer, based upon the total weight of the copolymer, and Xs is the fraction soluble in xylene at 25° C. (wt %) of the propylene ethylene copolymer, based upon the total weight of the copolymer.

2. The propylene ethylene copolymer according to claim 1 having a melt flow rate MFR, (ISO 1133 (230° C., 2.16 kg) ranging from 0.2 g/10 min to 100 g/10 min.

3. The propylene ethylene copolymer according to claim 1 having the ethylene derived units content ranging from 3.3 wt % to 10.2 wt %, based upon the total weight of the copolymer.

4. The propylene ethylene copolymer according to claim 1, wherein the fraction soluble in xylene at 25° C. ranges from 8.2 wt % to 25.3 wt %, based upon the total weight of the copolymer.

5. The propylene ethylene copolymer according to claim 1, wherein the intrinsic viscosity of the fraction soluble in xylene at 25° C. ranges from 3.5 dl/g to 5.2 dl/g.

6. The propylene ethylene copolymer according to claim 1, wherein relation (I) is $Tm>156-1.4\times C2$.

7. The propylene ethylene copolymer according to claim 1, wherein relation (II) is $TM>1920-285\times C2+50\times Xs$.

8. The propylene ethylene copolymer according to claim 1 having the ethylene derived units content ranging from 3.8 wt % to 9.2 wt %, based upon the total weight of the copolymer.

9. The propylene ethylene copolymer according to claim 1, wherein the fraction soluble in xylene at 25° C. ranges from 9.1 wt % to 22.0 wt %, based upon the total weight of the copolymer.

10. The propylene ethylene copolymer according to claim 1, wherein the intrinsic viscosity of the fraction soluble in xylene at 25° C. ranges from 3.7 dl/g to 5.0 dl/g.

\* \* \* \* \*